(12) United States Patent
Tanaka et al.

(10) Patent No.: US 8,477,944 B2
(45) Date of Patent: Jul. 2, 2013

(54) COMMUNICATION SYSTEM, BASE STATION APPARATUS AND TERMINAL APPARATUS

(75) Inventors: Yoko Tanaka, Mizuho (JP); Yoshinori Hatayama, Komaki (JP); Kazuya Ogawa, Mizuho (JP)

(73) Assignee: Hera Wireless S.A., Luxembourg (LU)

( * ) Notice: Subject to any disclaimer, the term of this patent is extended or adjusted under 35 U.S.C. 154(b) by 412 days.

(21) Appl. No.: 12/680,702

(22) PCT Filed: Sep. 24, 2008

(86) PCT No.: PCT/JP2008/002643
§ 371 (c)(1),
(2), (4) Date: Jun. 25, 2010

(87) PCT Pub. No.: WO2009/041033
PCT Pub. Date: Apr. 2, 2009

(65) Prior Publication Data
US 2010/0266125 A1 Oct. 21, 2010

(30) Foreign Application Priority Data

Sep. 28, 2007 (JP) .................................. 2007-255993
Sep. 28, 2007 (JP) .................................. 2007-255995

(51) Int. Cl.
*H04W 12/02* (2009.01)
(52) U.S. Cl.
USPC .......................................... 380/270; 709/206
(58) Field of Classification Search
USPC ......... 380/270, 244, 238, 239, 247, 248–249, 380/262, 269; 709/206; 370/328; 455/307, 455/414.7
See application file for complete search history.

(56) References Cited

U.S. PATENT DOCUMENTS 6,947,396 B1 * 9/2005 Salmi ............................ 370/310
7,295,524 B1 * 11/2007 Gray et al. .................... 370/254
(Continued)

FOREIGN PATENT DOCUMENTS

| JP | 2005-229477 | 8/2005 |
| JP | 2007-005892 | 1/2007 |
| JP | 2007-028304 | 2/2007 |

OTHER PUBLICATIONS

Beacon_Stuffing:Wi-Fi without Associations, Chandra et al, 2007 IEEE, pp. 53-57.*

(Continued)

*Primary Examiner* — Eleni Shiferaw
*Assistant Examiner* — Abu Sholeman
(74) *Attorney, Agent, or Firm* — DC Patent Lawyers, PLLC (57) ABSTRACT

An identifier generator generates a second identifier containing information on contents. The second identifier is different from a first identifier used to grant a connection request sent from a terminal apparatus. A beacon transmitter transmits the second identifier, generated by the identifier generator, as a beacon. A connection processing unit permits the connection request by the first identifier stored beforehand in the terminal apparatus, and rejects the connection request by the second identifier. A base station apparatus generates the first identifier containing address information used to access a server apparatus, as an identifier used to permit a connection request sent from the terminal apparatus. The base station apparatus transmits, as beacons, a first identifier and a second identifier used to identify the base station itself. The terminal apparatus acquires the address information contained in the received first identifier, conveys the second identifier to the server apparatus identified by the address information, and acquires information on the contents distributed by the base station apparatus.

8 Claims, 7 Drawing Sheets

U.S. PATENT DOCUMENTS

| | | | |
|---|---|---|---|
| 7,596,368 B2* | 9/2009 | Yamada et al. | 455/411 |
| 8,014,526 B2* | 9/2011 | Billhartz et al. | 380/268 |
| 8,145,131 B2* | 3/2012 | Kelsey et al. | 455/41.2 |
| 8,260,320 B2* | 9/2012 | Herz | 455/456.3 |
| 2002/0059614 A1* | 5/2002 | Lipsanen et al. | 725/75 |
| 2004/0068653 A1* | 4/2004 | Fascenda | 713/168 |
| 2005/0088980 A1* | 4/2005 | Olkkonen et al. | 370/255 |
| 2005/0117750 A1* | 6/2005 | Rekimoto | 380/247 |
| 2006/0023651 A1* | 2/2006 | Tsuchiuchi et al. | 370/310 |
| 2006/0140150 A1* | 6/2006 | Olvera-Hernandez et al. | 370/331 |
| 2006/0153122 A1* | 7/2006 | Hinman et al. | 370/328 |
| 2007/0081477 A1* | 4/2007 | Jakkahalli et al. | 370/310 |
| 2007/0129062 A1* | 6/2007 | Pantalone et al. | 455/414.1 |
| 2007/0178904 A1* | 8/2007 | Oyama | 455/445 |
| 2007/0254614 A1* | 11/2007 | Muralidharan et al. | 455/307 |
| 2007/0270129 A1* | 11/2007 | Luo | 455/414.1 |
| 2007/0281711 A1* | 12/2007 | Matta | 455/453 |
| 2008/0004018 A1* | 1/2008 | Adachi et al. | 455/435.1 |
| 2008/0076420 A1* | 3/2008 | Khetawat et al. | 455/435.1 |
| 2008/0089305 A1* | 4/2008 | Yao et al. | 370/342 |
| 2008/0181385 A1* | 7/2008 | Eveland | 379/219 |
| 2009/0019283 A1* | 1/2009 | Muralidharan et al. | 713/168 |
| 2009/0161595 A1* | 6/2009 | McNew et al. | 370/312 |
| 2010/0074261 A1* | 3/2010 | Muhamed | 370/395.3 |
| 2010/0099455 A1* | 4/2010 | Bari et al. | 455/553.1 |
| 2010/0208897 A1* | 8/2010 | Goto | 380/279 |
| 2011/0047603 A1* | 2/2011 | Gordon et al. | 726/5 |
| 2012/0162013 A1* | 6/2012 | Piersol et al. | 342/386 |
| 2012/0163264 A1* | 6/2012 | Chu et al. | 370/311 |
| 2012/0327857 A1* | 12/2012 | Zimmerman et al. | 370/328 |

OTHER PUBLICATIONS

International Search Report issued in International Patent Application No. PCT/JP2008/002643, dated Dec. 9, 2008.

International Preliminary Report on Patentability and Written Opinion issued in International Patent Application No. PCT/JP2008/002643, dated May 4, 2010.

* cited by examiner

COMMUNICATION SYSTEM, BASE STATION APPARATUS AND TERMINAL APPARATUS

RELATED APPLICATIONS

This application is the U.S. National Phase under 35 U.S.C. §371 of International Application No. PCT/JP2008/002643, filed on Sep. 24, 2008, which in turn claims the benefit of Japanese Application Nos. 2007-255993, filed on Sep. 28, 2007 and 2007-255995, filed on Sep. 28, 2007, the disclosures of which Applications are incorporated by reference herein.

TECHNICAL FIELD

The present invention relates to a communication system for distributing contents, a base station apparatus for distributing the contents, and terminal apparatus for receiving the contents.

BACKGROUND TECHNOLOGY

In recent years, content distribution using wireless LAN (Local Area Network) has been in widespread use. With the speeding up of wireless LAN, moving image distribution services are also in practical use. An access point in the wireless LAN transmits a beacon at regular intervals, and a terminal apparatus such as a mobile phone receives the beacon. The beacon contains a predetermined identifier. The terminal apparatus sends a connection request to the access point, using the identifier. The access point grants connection only to the terminal device whose identifier is in agreement with its own.

As the above-mentioned identifier, a service set identifier (SSID) or an extended service set identifier (ESSID) may be set in the IEEE 802.11 series, for instance. The ESSID is an extended version of the SSID, and in this patent specification they will be generically referred to simply as "SSID". The SSID, which is a network identifier, allows identification of the network and access point to connect to even when there are a plurality of wireless LANs structured in the neighborhood. In the SSID, only alphameric and some symbolic characters (hereinafter collectively referred to as "alphameric and other characters") are usable.

Patent Document 1 discloses an information distribution system, and in this information distribution system, there is a predetermined correspondence relationship between the information type names of information whose delivery is to be requested by a wireless LAN terminal, network identifiers broadcast by an access point, and host names of information distribution servers.

[Patent Document 1] Japanese Patent Application Publication No. 2007-5892.

DISCLOSURE OF THE INVENTION

Problems to be Solved by the Invention

However, where information is to be offered to a user by the use of an identifier, such as an SSID, for which the number of characters settable is limited, the amount of information that can be distributed to the user is subject to a limitation. Thus, it is difficult to have the user fully understand the services offered by the access point from such an identifier.

The present invention has been made under the foregoing circumstances, and a purpose thereof is to provide a communication system, a base station apparatus, and a terminal apparatus which can supply a sufficient amount of information to the user of the terminal apparatus using an identifier for which the number of characters settable is limited.

Means for Solving the Problems

A base station apparatus according to one embodiment of the present invention distributes a predetermined content and it comprises: an identifier generator configured to generate a second identifier, containing information on the content, which is different from a first identifier by which to permit a connection request sent from a terminal apparatus; and a beacon transmitter configured to transmit the second identifier, generated by the identifier generator, as a beacon.

Optional combinations of the aforementioned constituting elements, and implementations of the invention in the form of methods, apparatuses, systems, recording mediums, computer programs and so forth may also be effective as additional modes of the present invention.

Effect of the Invention

The present invention provides a sufficient amount of information to the user of a terminal apparatus using an identifier for which the number of characters settable is limited.

DESCRIPTION OF THE REFERENCE NUMERALS

10 Base station apparatus
11 Service information storage
12 Service ID storage
13 Identifier generator
14 Beacon transmitter
15 Connection processing unit
16 Connecting identifier storage
20 Terminal apparatus
21 Beacon receiver
22 Identifier processing unit
23 Service ID storage
24 Connecting identifier storage
25 User interface
26 Connection processing unit
100 Communication system
1010 Base station apparatus
1011 Device information storage
1012 Service information transmitter
1013 Identifier generator
1014 Beacon transmitter 1015 Connection processing unit
1020 Terminal apparatus
1021 Beacon receiver
1022 Identifier processing unit
1023 Service ID storage
1024 Service information acquiring unit
1025 User interface
1026 Connection processing unit
1030 Server apparatus
1031 Service information receiver
1032 Service information storage
1033 Service information providing unit
1100 Communication system

BEST MODE FOR CARRYING OUT THE INVENTION

First Embodiment

Figure 1:
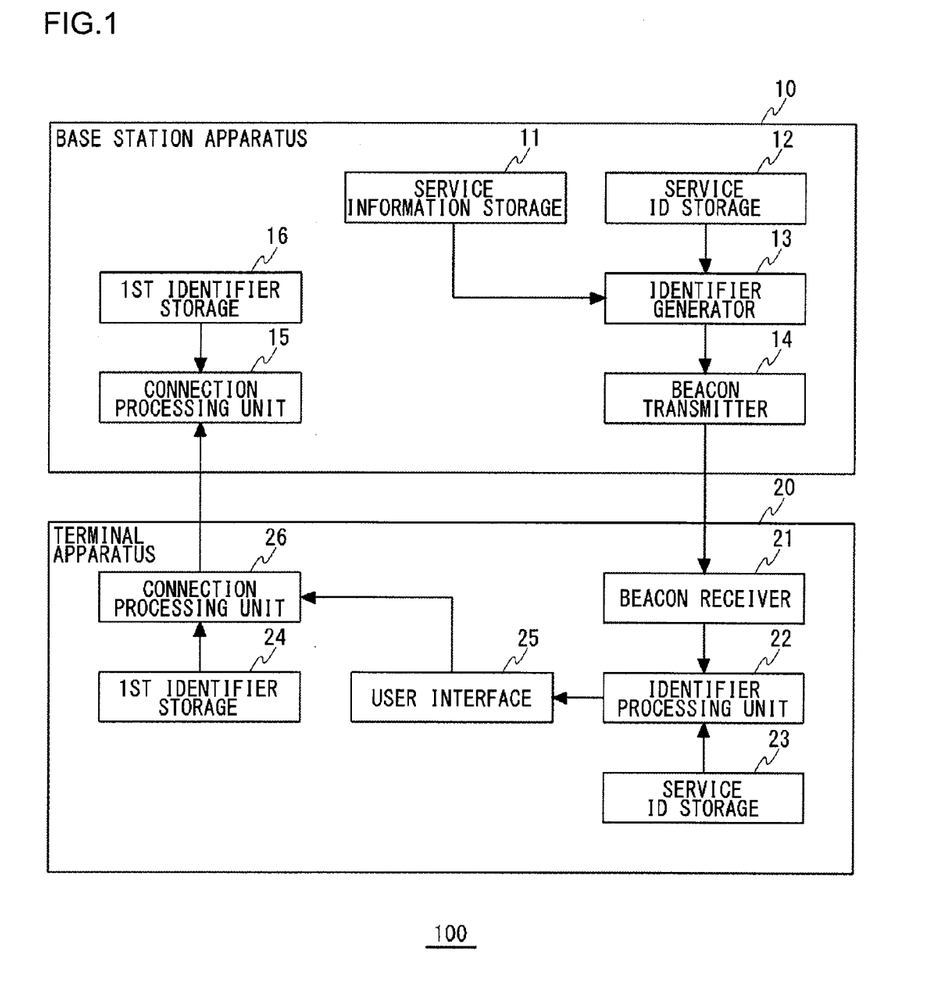
FIG. 1 is a block diagram showing a communication system according to a first embodiment of the present invention.

FIG. 1 is a block diagram showing a structure of a communication system 100 according to a first embodiment of the present invention. The communication system 100 includes a base station apparatus 10 and a terminal apparatus 20. The base station apparatus 10 is an access point that constitutes a wireless LAN, and distributes contents, receivable and reproducible by the terminal apparatus 20, by multicast. The content or contents may contain at least one of texts, still images, moving images, audio, metadata and the like. Assume as an example in the following description that the base station apparatus 10 is installed in a commercial premise such as a convenience store and that the base station apparatus 10, which functions as an independent broadcasting system, distributes the contents to within the store or its neighboring premises by multicast. For example, advertisement images or coupons are distributed as the contents.

The base station apparatus 10 includes a service information storage 11, a service ID storage 12, an identifier generator 13, a beacon transmitter 14, a connection processing unit 15, and a connecting identifier storage (denoted as a first identifier storage in FIG. 1) 16. The base station apparatus 10 further includes a not-shown content distribution processing unit. The content distribution processing unit performs content distribution processing on the terminal apparatus 20. The terminal apparatus 20 includes a beacon receiver 21, an identifier processing unit 22, a service ID storage 23, a connecting identifier storage (denoted as a first identifier storage in FIG. 1) 24, a user interface 25, and a connection processing unit 26. The terminal apparatus 20 further includes a not-shown content receiving processing unit. The content receiving processing unit receives contents distributed from the base station apparatus 10.

The structure of the base station apparatus 10 and the structure of the terminal apparatus 20 may be achieved hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

The service information storage 11 stores service information. The service information is information on the type of content to be distributed, for instance, and is set in advance by a manager. For example, it is set like a Japanese message meaning "Sanyo Electric Store Sale—Gifu Hashima Station Store—". Like this, service information can be freely written in a character string containing kanji characters (Chinese characters), katakana characters, and hiragana characters among others.

The service ID storage 12 stores service IDs. The service ID is an identifier identifying the distribution service for the particular content and is set in advance by the manager. The service ID is formed in a character string written with alphameric and other characters.

The identifier generator 13 generates a second identifier including information on the content, different from a first identifier by which to permit a connection request sent from the terminal apparatus 20. The first identifier is a connecting identifier to be used in actual connection. The second identifier is a conveying identifier for giving the terminal apparatus 20 information by which the user decides whether to receive the content or not. The first identifier and the second identifier may each be an SSID.

The identifier generator 13 converts a first character string, which contains characters not prescribed and therefore unusable for the second identifier, into a second character string, which is composed of characters prescribed and therefore usable for the second identifier, and then generates a second identifier containing the second character string. Where the second identifier is an SSID, the characters not usable in the second identifier are characters other than the alphameric characters, which include kanji, hiragana and katakana characters. They further include Korean (hangul) characters and Chinese characters. The second character string is a character string written only with the alphameric and other characters.

Where the second identifier is an SSID, the identifier generator 13 generates an SSID composed of 32 or less alphameric and other characters by combining the above-mentioned service ID and the above-mentioned service information and converting the character string. Note that when the character string obtained by combining the above-mentioned service ID and the above-mentioned service information and converting the character string exceeds the limited number of characters for an identifier, the identifier generator 13 divides the character string into a plurality of character strings and has them contained respectively in a plurality of identifiers. More specifically, when the character string obtained by conversion has exceeded 32 characters, the character string is divided into two or more of character strings in such a manner that each of the character strings after the division is composed of 32 characters or less.

The beacon transmitter 14 transmits as a beacon the second identifier generated by the identifier generator 13. The connecting identifier storage 16 stores the first identifier. The first identifier is also stored in the terminal apparatus 20 which is granted a connection to the base station apparatus 10. In the present embodiment, however, the first identifier is not transmitted. In other words, the first identifier is undisclosed, or in a stealth setting, to the terminal apparatus 20.

The connection processing unit 15 rejects a connection request using the second identifier from the terminal apparatus 20 and permits a connection request using the first identifier which is held in advance by the terminal apparatus 20. The connection processing unit 15 references the connecting identifier storage 16 and permits a connection if the connection request is by the first identifier stored there. On the other hand, the connection processing unit 15 rejects the connection request by a first identifier not stored in the connecting identifier storage 16 or by a second identifier.

The terminal apparatus 20 is a terminal capable of receiving the above-described contents after the terminal apparatus 20 has been connected to the base station apparatus 10. The terminal apparatus 20 may correspond to a mobile phone, a smart phone, a notebook PC, a dedicated terminal and the like, for instance.

The beacon receiver 21 receives a beacon transmitted from the base station apparatus 10. More specifically, the beacon receiver 21 receives a second identifier containing service information, or information on the content, which is generated apart from the first identifier, as a beacon from the base station apparatus 10.

The service ID storage 23 stores a service ID corresponding to the service ID held by the base station apparatus 10. This service ID may be set at the time of downloading an application for reproducing the content, manually inputted by the user, or set by any other method.

The identifier processing unit 22 extracts the aforementioned service information from the second identifier contained in the beacon received by the beacon receiver 21. Specifically, the identifier processing unit 22 restores the first character string by performing a reverse conversion on the second character string contained in the second identifier received by the beacon receiver 21. More specifically, the service ID contained in the second identifier is extracted, and a decision is made as to whether the service ID is the one stored in the service ID storage 23 or not. When the service ID is stored in the service ID storage 23, the service information contained in the second identifier is obtained by carrying out a reverse processing of what is done by the identifier generator 13 of the base station apparatus 10. When the service ID is not stored in the service ID storage 23, it is not necessary to perform a reverse conversion of the above-described second identifier generation processing.

The connecting identifier storage 24 stores a first identifier set by the base station apparatus 10. As with the service ID, the first identifier may be set at the time of downloading an application for reproducing the content, manually inputted by the user, or set by any other method. The first identifier is stored in association with the service ID.

The user interface 25, which is provided at least with a not-shown display or audio output unit and an operation unit, presents the service information extracted by the identifier processing unit 22 and prompts the user to send a connection requesting instruction to the base station apparatus 10. The user interface 25 may display the service information on the display unit or make an audio output of the service information from the audio output unit. At this time, if a plurality of second identifiers have been received, a plurality of pieces of service information are displayed. In so doing, it is desirable that the second identifiers be displayed on a preferential basis of receiving strength. For example, the second identifiers may be displayed on a screen in descending order of receiving strength. When second identifiers have been received from a plurality of base station apparatuses 10, it may facilitate the user to recognize which base station apparatus 10 he/she should send a connection request to.

Upon receipt of the connection requesting instruction from the user interface 25, the connection processing unit 26 acquires, from the connecting identifier storage 16, a first identifier corresponding to the second identifier and makes a connection request to the base station apparatus 10 using the acquired first identifier. More specifically, when specific service information is selected and a connection to the corresponding base station apparatus 10 is instructed by the user at the user interface 25, the connection processing unit 26 makes a connection request to the base station apparatus 10 using the first identifier corresponding to the service ID of the service information.

An operation of the communication system 100 according to the first embodiment of the present invention is now described.

Figure 2:
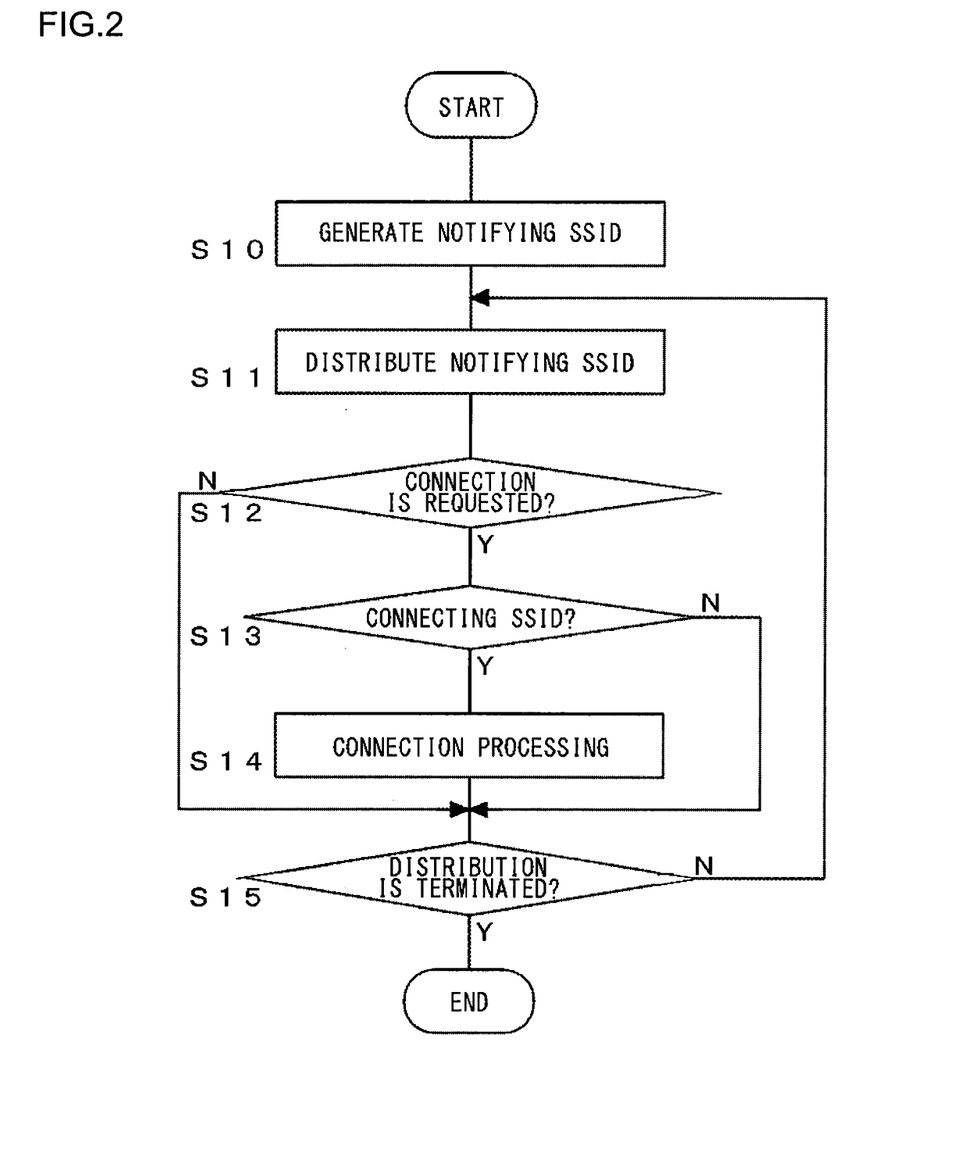
FIG. 2 is a flowchart showing an operation of a base station apparatus according to a first embodiment.

FIG. 2 is a flowchart showing an operation of the base station apparatus 10 according to the first embodiment.

The identifier generator 13 acquires service information from the service information storage 11, acquires a service ID from the service ID storage 12, and generates a conveying SSID, based on the above-described SSID generation processing (S10).

Here, a description will be given of an example of the generation processing of conveying SSID.

In this example, it is assumed that the service ID is a character string "broadserv" which contains alphameric and other characters only and that the service information is a Japanese message meaning "Sanyo Electric Store Sale—Gifu Hashima Station Store—" which contains kanji characters and kana characters. In this example, the service information is written in SJIS code. Under this assumption, the service ID can be used as it is. However, the service information contains kanji and kana characters not usable as an SSID, and therefore this character string is converted into a character string of alphameric and other characters.

Specifically, the character string which is a Japanese message meaning "Sanyo Electric Store Sale—Gifu Hashima Station Store—" is compressed and converted into binary data. Then the binary data is converted into a character string containing the alphameric and other characters, "94h9ghkhkvaribh-95hdlvircfk", by use of a conversion means such as BASE64. Note that this character string is for the illustrative purpose only. As a result of conversion, a character string composed of alphameric and other characters is acquired. Then, the thus acquired character string is bound together by the service ID, which in turn generates a character string "broadserv_94h9ghkhkvaribh-95hdlvircfk".

The beacon transmitter 14 distributes a conveying SSID generated by the identifier generator 13 as a beacon (S11). Then, upon receipt of a connection request from the terminal apparatus 20 (Y of S12), the connection processing unit 15 determines whether the received connection request is a connection request by a connecting SSID or not (S13). Here, the conveying SSID is an example of the above-described second identifier (conveying identifier), whereas the connecting SSID is an example of the above-described first identifier (connecting identifier). If it is the connection request by the connecting SSID (Y of S13), the connection request will be granted and the connection processing is performed (S14). If it is the connection request by the conveying SSID (N of S13), the connection request will be rejected and no connection processing is carried out. The processings of Step S11 through Step S14 are repeated until the end of the content distribution (Y of S15).

Figure 3:
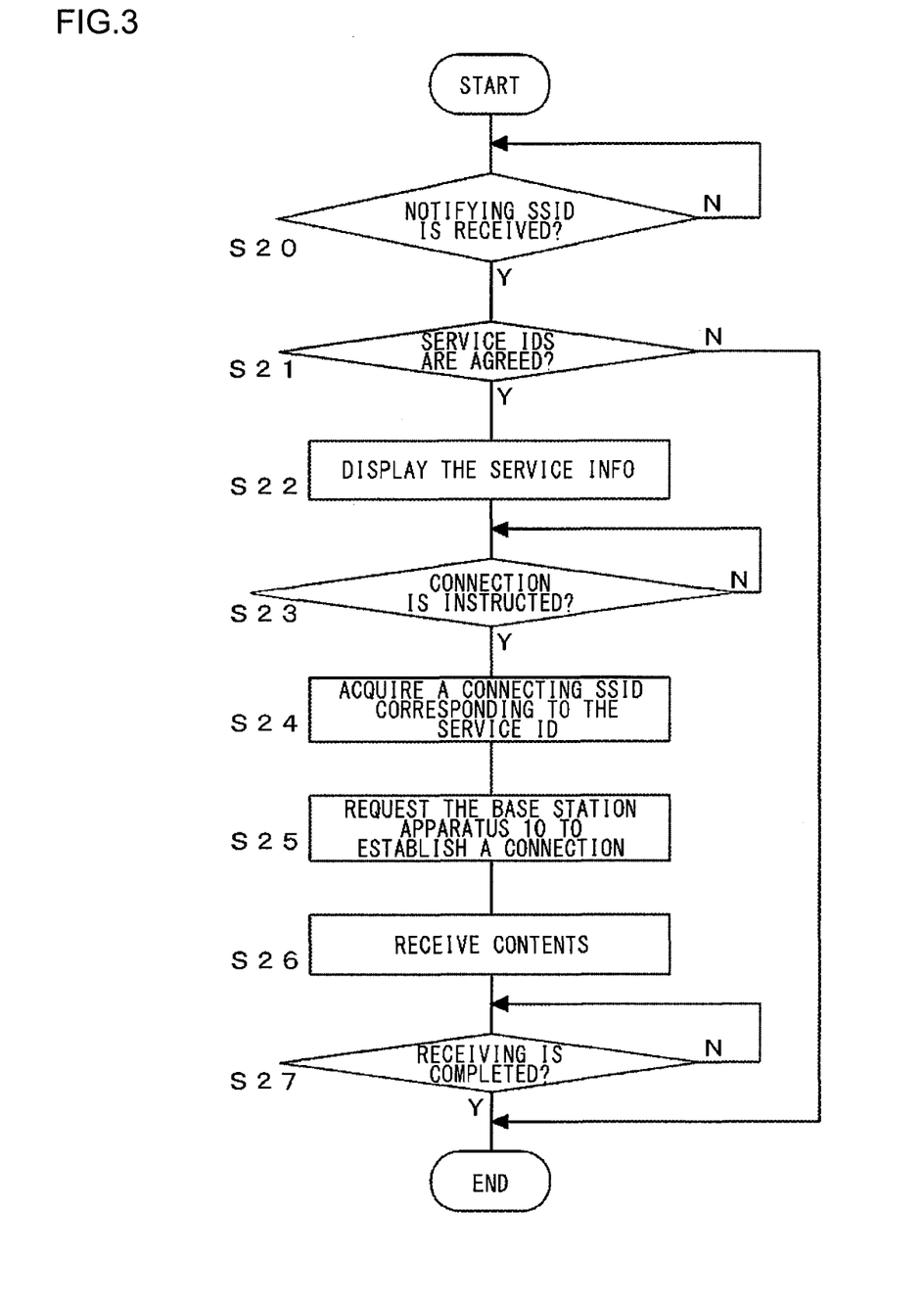
FIG. 3 is a flowchart showing an operation of a terminal apparatus according to a first embodiment.

FIG. 3 is a flowchart showing an operation of the terminal apparatus 20 according to the first embodiment.

When the terminal apparatus 20 seeks a connection with the base station apparatus 10, the beacon receiver 21 receives a conveying SSID sent out from the base station apparatus 10 (S20). The identifier processing unit 22 determines if the service ID contained in the conveying SSID is in agreement with any of service IDs stored in the service ID storage 23 or not (S21). If the service ID contained therein is in agreement with one of them stored therein (Y of S21), the above-described reverse conversion of the generation processing will be performed so as to extract the service information contained in the conveying SSID and the user interface 25 will display the extracted service information (S22) and wait for instructions from the user.

Upon receipt of instructions for a connection from the user (Y of S23), the connection processing unit 26 acquires a connecting SSID corresponding to the aforementioned service ID from the connecting identifier storage 24 (S24). Using the connecting SSID thus acquired, the connection processing unit 26 makes a connection request to the base station apparatus 10 (S25). Then the terminal apparatus 20 receives the content from the base station apparatus 10 (S26). The receiving of the content is terminated by either the completion of the content or an end instruction from the user (Y of S27).

According to the present embodiment as described above, the second identifier, containing information for making a decision on the content, which is different from the first identifier used in actual connection is generated and distributed, so that a sufficient amount of information can be offered to the user of the terminal apparatus using an identifier for which the number of characters is limited. Also, the connection request using the distributed second identifier is rejected and the first identifier is undisclosed, and only the connection request from the terminal apparatus to which the first identifier has been informed beforehand is granted. Thus the access from terminal apparatus incompatible with the present communication system can be restricted. As a result, a fee-based service and a service rendered to members only can be easily achieved.

Also, according to the present embodiment, on a base station apparatus 10 side, the first character string containing characters other than the alphanumeric characters is converted into the second character string written only with the alphanumeric and other characters and then an identifier containing the second character string only is generated. On a terminal apparatus 20 side, the first character string is restored by performing a reverse conversion on the second character string contained in the identifier. Hence, even though an identifier for which the types of usable characters are limited, an easy-to-understand display can be presented to the user of the terminal apparatus. For example, the user of the terminal apparatus can view the content displayed in kanji and kana characters instead of the alphameric and other characters.

The present invention has been described based upon an illustrative embodiment. The first embodiment is intended to be illustrative only and it will be obvious to those skilled in the art that various modifications to the combination of constituting elements and processes could be developed and that such modifications are also within the scope of the present invention.

In the above-described first embodiment, a description has been given of an example where the first identifier is not distributed. As a modification thereto, an example is conceivable where the first identifier is encrypted and distributed as a beacon. In this modification, the identifier generator 13 encrypts the first identifier. For example, the first identifier is encrypted using a wired equivalent privacy (WEP). The beacon transmitter 14 transmits the first identifier encrypted by the identifier generator 13 as a beacon.

The terminal apparatus 20 has an encryption key storage in substitution for the connecting identifier storage 24. In this modification, the encryption key storage stores an encryption key used to decrypt an encrypted first identifier by which the base station apparatus 10 permits a connection request. For example, a WEP key is stored. This WEP key, too, may be acquired by employing the same method as that involving the service ID and the first identifier according to the first embodiment. In this modification, the beacon receiver 21 receives a second identifier, containing information on the content, which is generated apart from a first identifier and an encrypted first identifier, from the base station apparatus 10 as beacons. Upon receipt of the connection requesting instruction from the user interface 25, the connection processing unit 26 acquires an encryption key used to decrypt the encrypted first identifier, from the encryption key storage. And the connection processing unit 26 decrypts the encrypted first identifier using the acquired encrypted key and makes a connection request to the base station apparatus 10 using the decrypted first identifier. For example, the connection processing unit 26 acquires a WEP key corresponding to the encrypted first identifier received by the beacon receiver 21, from the encryption key storage and decrypts the first identifier using the encryption key. Then the connection processing unit 26 makes a connection request to the base station apparatus 10 using the decrypted first identifier.

The connection processing unit 15 on the base station apparatus 10 side permits the connection request by the first identifier decrypted by the terminal apparatus 20. According to this modification, the same effect as that of the above-described first embodiment is achieved. Since the terminal apparatus 20 no longer holds the first identifier, the need to hold all of the first identifiers is also eliminated. Thus the memory capacity required by the terminal apparatus 20 is reduced and, at the same time, the first identifier can be freely set and changed in the base station apparatus 10, too.

In the first embodiment, the identifier generator 13 appends the service information directly to an SSID except for the conversion of the type of characters. In this regard, any conversion such as encryption and compression may be further performed. Also, the identifier generator 13 may set a plurality of conveying SSIDs and the service information may be included respectively in a plurality of conveying SSIDs by dividing the service information. And the identifier processing unit 22 may integrate them into a single piece. According to this modification, the number of characters of service information can be set if it exceeds 32.

Moreover, a WEP key may be set to the first identifier (e.g., SSID).

In the first embodiment, it is assumed that the service ID is formed in a character string written with alphameric and other characters. However, the service ID may be a character string of meaningless binary data or a string of characters containing kanji and kana characters. In such a case, the identifier processing unit 22 will first restore a conveying SSID received and then verify the service ID.

Second Embodiment

The invention is now described based on a second embodiment. The second embodiment relates to a communication system, a base station apparatus and a terminal apparatus.

A description is given of the background technology of the second embodiment.

In recent years, content distribution using wireless LAN (Local Area Network) has been in widespread use. With the speeding up of wireless LAN, moving image distribution services are also in practical use. An access point in the wireless LAN transmits a beacon at regular intervals, and a terminal apparatus such as a mobile phone receives the beacon. The beacon contains a predetermined identifier. The terminal apparatus sends a connection request to the access point, using the identifier. The access point permits connection only to the terminal device whose identifier is in agreement with its own.

As the aforementioned identifier, a service set identifier (SSID) or an extended service set identifier (ESSID) may be set in the IEEE 802.11 series, for instance. The ESSID is an extended version of the SSID, and ESSID will be described as an example in this patent specification. The ESSID, which is a network identifier, allows identification of the network and access point to connect to even when there are a plurality of wireless LANs structured in the neighborhood. In the ESSID, only alphameric and some symbolic characters (hereinafter collectively referred to as "alphameric and other characters") are usable.

Patent Document 2 discloses an information distribution system, and in this information distribution system, there is a predetermined correspondence relationship between the information type names of information whose delivery is to be requested by a wireless LAN terminal, network identifiers broadcast by an access point, and host names of information distribution servers.

[Patent Document 2] Japanese Patent Application Publication No. 2007-5892.

A problem to be solved by employing the second embodiment is now described.

Where information is to be offered to a user by the use of an identifier, such as an ESSID, for which the number of characters settable is limited, the amount of information that can be distributed to the user is subject to a limitation. Thus, it is difficult to have the user fully understand the services offered by the access point from such an identifier.

The present invention has been made under the foregoing circumstances, and a purpose thereof is to provide a communication system, a base station apparatus, and a terminal apparatus which can supply a sufficient amount of information to the user of the terminal apparatus using an identifier for which the number of characters settable is limited.

Means for solving the problems in the second embodiment is now described.

A communication system according to one embodiment of the present invention includes a base station apparatus, a terminal apparatus and a server apparatus, and the communication system distributes a predetermined content from the base station apparatus. The base station apparatus includes: an identifier generator configured to generate, as an identifier by which to permit a connection request sent from the terminal apparatus, a first identifier containing address information necessary for accessing the server apparatus; and a beacon transmitter configured to transmit the first identifier generated by the identifier generator and a second identifier by which to identify the base station apparatus, as beacons. The terminal apparatus includes: a beacon receiver configured to receive the beacons transmitted from the base station apparatus; an identifier processing unit configured to acquire address information contained in the first identifier received by the beacon receiver; and an information acquiring unit configured to convey the second identifier, received by the beacon receiver, to a server apparatus, identified by the address information acquired by the identifier processing unit, via a network different from a network to be connected to the base station and configured to acquire information on the content from the identified server. The server apparatus includes: a storage configured to store the second identifier and the information on the content by associating the second identifier with the information on the content; and an information providing unit configured to present information, on the content corresponding to the second identifier conveyed from the terminal apparatus, to the terminal apparatus by referencing the storage.

Optional combinations of the aforementioned constituting elements, and implementations of the invention in the form of methods, apparatuses, systems, recording media, computer programs and so forth may also be effective as additional modes of the present invention.

The present invention provides a sufficient amount of information to the user of a terminal apparatus using an identifier for which the number of characters settable is limited.

A description is given of a best mode for carrying out the invention by way of the second embodiment.

Figure 4:
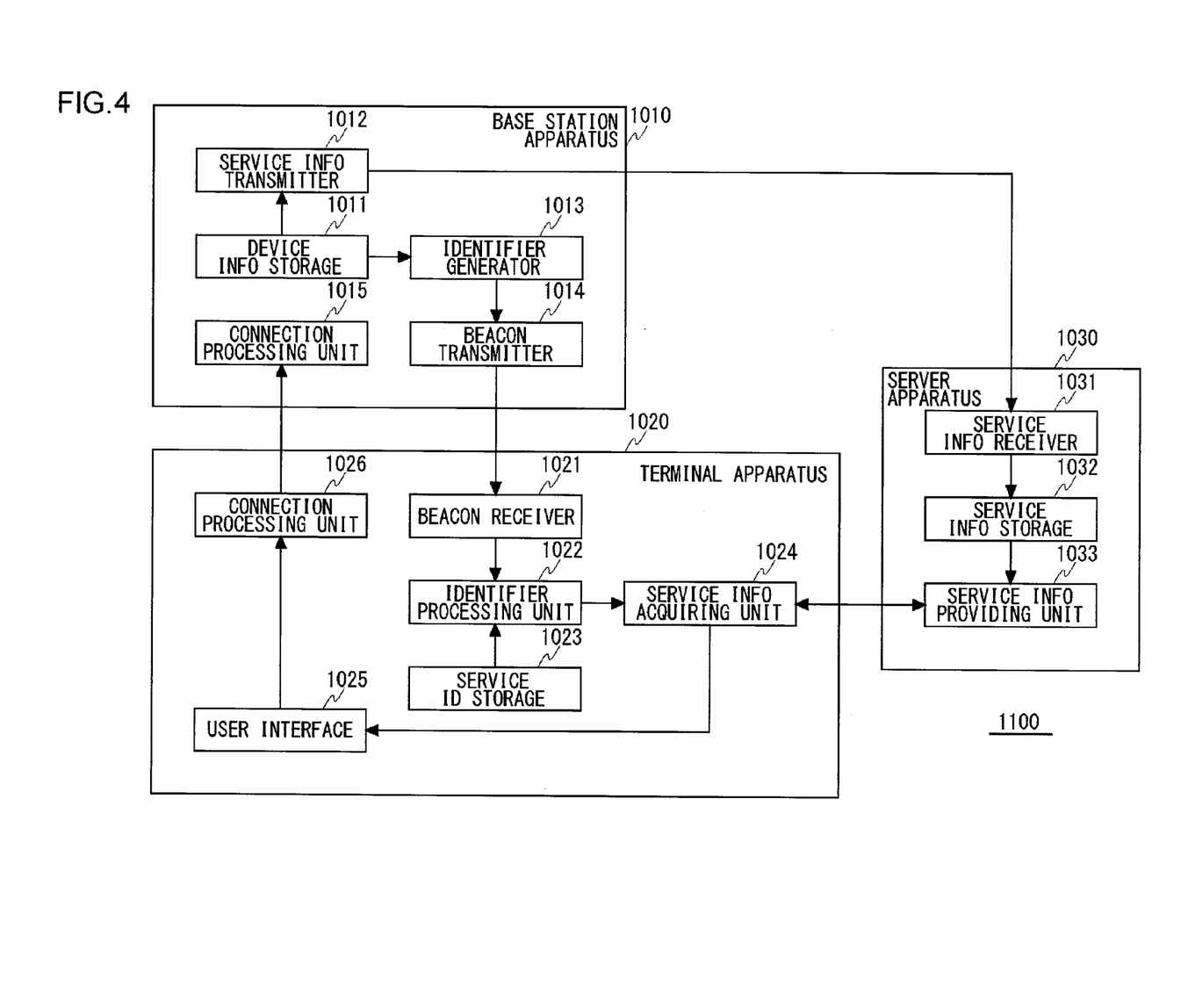
FIG. 4 is a block diagram showing a communication system according to a second embodiment of the present invention.

FIG. 4 is a block diagram showing a structure of a communication system 1100 according to the second embodiment of the present invention. The communication system 1100 includes a base station apparatus 1010, a terminal apparatus 1020, and a server apparatus 1030. The base station apparatus 1010 is an access point that constitutes a wireless LAN, and distributes contents, receivable and reproducible by the terminal apparatus 1020, by multicast. The content or contents may contain at least one of texts, still images, moving images, audio, metadata and the like. Assume as an example in the following description that the base station apparatus 1010 is installed in a commercial premise such as a convenience store and the base station apparatus 1010, which functions as an independent broadcasting system, distributes the contents to within the store or its neighboring premises by multicast. For example, advertisement images or coupons are distributed as the contents.

The base station apparatus 1010 includes a device information storage 1011, a service information transmitter 1012, an identifier generator 1013, a beacon transmitter 1014, and a connection processing unit 1015. The base station apparatus 1011 further includes a not-shown content distribution processing unit. The content distribution processing unit performs content distribution processing on the terminal apparatus 1020. The terminal apparatus 1020 includes a beacon receiver 1021, an identifier processing unit 1022, a service ID storage 1023, a service info acquiring unit 1024, a user interface 1025, and a connection processing unit 1026. The terminal apparatus 1020 further includes a not-shown content receiving processing unit. The content receiving processing unit receives contents distributed from the base station apparatus 1010. The server apparatus 1030 includes a service information receiver 1031, a service information storage 1032, and a service information providing unit 1033.

The structure of the base station apparatus 1010, the structure of the terminal apparatus 1020 and the structure of the server apparatus 1030 may be achieved hardwarewise by elements such as a CPU, memory and other LSIs of an arbitrary computer, and softwarewise by memory-loaded programs or the like. Depicted herein are functional blocks implemented by cooperation of hardware and software. Therefore, it will be obvious to those skilled in the art that the functional blocks may be implemented by a variety of manners including hardware only, software only or a combination of both.

The device information storage 1011 stores service information concerning the contents distributed from the base station apparatus 1010, service IDs, address information with which to access the server apparatus 1030 storing the service information, and an identifier used to identify the base station apparatus 1010.

The service information is information on the type of content to be distributed, for instance, and is set in advance by a manager. For example, it is set like a Japanese message meaning "Sanyo Electric Store Special Sale Information (covering Digital Cameras)—Gifu Hashima Station Store—September 30". Like this, service information can be freely written in a character string containing kanji characters (Chinese characters), katakana characters, and hiragana characters among others. The service ID is an identifier to identify the distribution service for the particular content and is set in advance by the manager. The service ID is constituted by a character string using alphameric and other characters.

The address information with which to access the server apparatus 1030 that stores the service information may be a uniform resource locator (URL). A description will be given hereinbelow of an example where a URL is used. If the server apparatus 1030 provides a single piece of service information, an IP address may be used. The identifier used to identify the base station apparatus 1010 may be a basic service set identifier (BSSID). A description will be given hereinbelow of an example where a BSSID is used. Normally, a media access control (MAC) address of the base station apparatus 1010 is set in the BSSID.

The service information transmitter 1012 transmits the aforementioned service information and BSSID to the server apparatus 1030. They may be transmitted via a general IP network. The URL of the server apparatus is stored in the device information storage 1011. If the server apparatus 1030 is located within a wireless LAN, it may be connected via the wireless LAN.

The identifier generator 1013 generates an identifier by which to permit a connection request sent from the terminal apparatus 1020. The identifier may be an ESSID. When generating the identifier, the identifier generator 1013 generates the identifier by including address information used to access the server address 1030 therein. In the present embodiment, the URL of the server apparatus 1030 is included therein. In do doing, the URL may be compressed and the thus compressed URL may be included in the ESSID. Moreover, the aforementioned service ID is included in this ESSID. A detailed description of these generation processings will be given later.

The beacon transmitter 1014 transmits the identifier generated by the identifier generator 1013 and the identifier used to identify the base station apparatus 1010, as beacons. Specifically, beacons including ESSID and BSSID are transmitted. The connection processing unit 1015 establishes a connection in response to a connection request from the terminal apparatus 1020.

The terminal apparatus 1020 is a terminal capable of receiving the above-described contents after the terminal apparatus 1020 has been connected to the base station apparatus 1010. Also, the terminal apparatus 1020 is a terminal capable of receiving information from the server apparatus 1030 after the terminal apparatus 1020 has been connected to the server apparatus 1030. The terminal apparatus 1020 corresponds to a mobile phone, a smart phone, a notebook PC, a dedicated terminal and the like, for instance.

The beacon receiver 1021 receives the beacon transmitted from the base station apparatus 1010. Specifically, the beacon receiver 1021 receives the ESSID and BSSID.

The service ID storage 1023 stores a service ID corresponding to the service ID held by the device information storage 1011 of the base station apparatus 1010. This service ID may be set at the time of downloading an application for reproducing the content, manually inputted by the user, or set by any other method.

The identifier processing unit 1022 acquires address information on the server apparatus 1030 contained in the identifier received from the beacon receiver 1021. More specifically, a service ID is acquired from the ESSID received by the beacon receiver 1021 and is verified against the service ID stored in the service ID storage 1023. If the acquired service ID is in agreement with the service ID stored therein, the URL of the server apparatus 1030 will be acquired from the ESSID. If the URL has been compressed, it will be decompressed and the original content will be restored. This restoration processing is a reverse conversion of the URL generation processing performed by the identifier generator 1013.

Using the address information acquired by the identifier processing unit 1022, the service information acquiring unit 1024 conveys an identifier, by which to identify the base station apparatus 1010, received by the beacon receiver 1021 to the server apparatus 1030 so as to acquire service information. More specifically, the service information acquiring unit 1024 accesses the server apparatus 1030, based on the URL acquired by the identifier processing unit 1022, and conveys the BSSID received by the beacon receiver 1021 to the server apparatus 1030 so as to acquire the service information corresponding to the aforementioned service ID. In so doing, access is made via a network to connect to the base station apparatus 1010, namely a network other than the wireless LAN. Access is made via a mobile phone network, for instance.

The user interface 1025, which is provided at least with a not-shown display or audio output unit and an operation unit, presents the service information extracted by the service information acquiring unit 1024 and prompts the user to send a connection requesting instruction to the base station apparatus 1010. The user interface 1025 may display the service information on the display unit or make an audio output of the service information from the audio output unit.

When a connection is indicated by the user at the user interface 1025, the connection processing unit 1026 makes a connection request to the base station apparatus 1010 using the identifier, namely ESSID, received by the beacon receiver 1021.

The service information receiver 1031 receives the service information transmitted from the service information transmitter 1012 of the base station apparatus 1010 and an identifier, namely a BSSID, by which to identify the base station apparatus 1010, and stores them in the service information storage 1032.

The service information storage 1032 stores the identifier, namely a BSSID, used to identify the base station apparatus 1010 and the service information distributed from the base station apparatuses 1010 by associating the identifier with the service information. When a plurality of base station apparatuses 1010 are installed, a plurality of pieces of service information are stored.

The service information providing unit 1033 acquires an identifier, which is used to identify the base station apparatus 1010 and is conveyed from the terminal apparatus 1020, namely the service information corresponding to the BSSID, by referencing the service information storage 1032. Then the service information providing unit 1033 supplies the thus acquired identifier to the terminal apparatus 1020.

An operation of the communication system 1100 according to the second embodiment of the present invention is now described.

Figure 5:
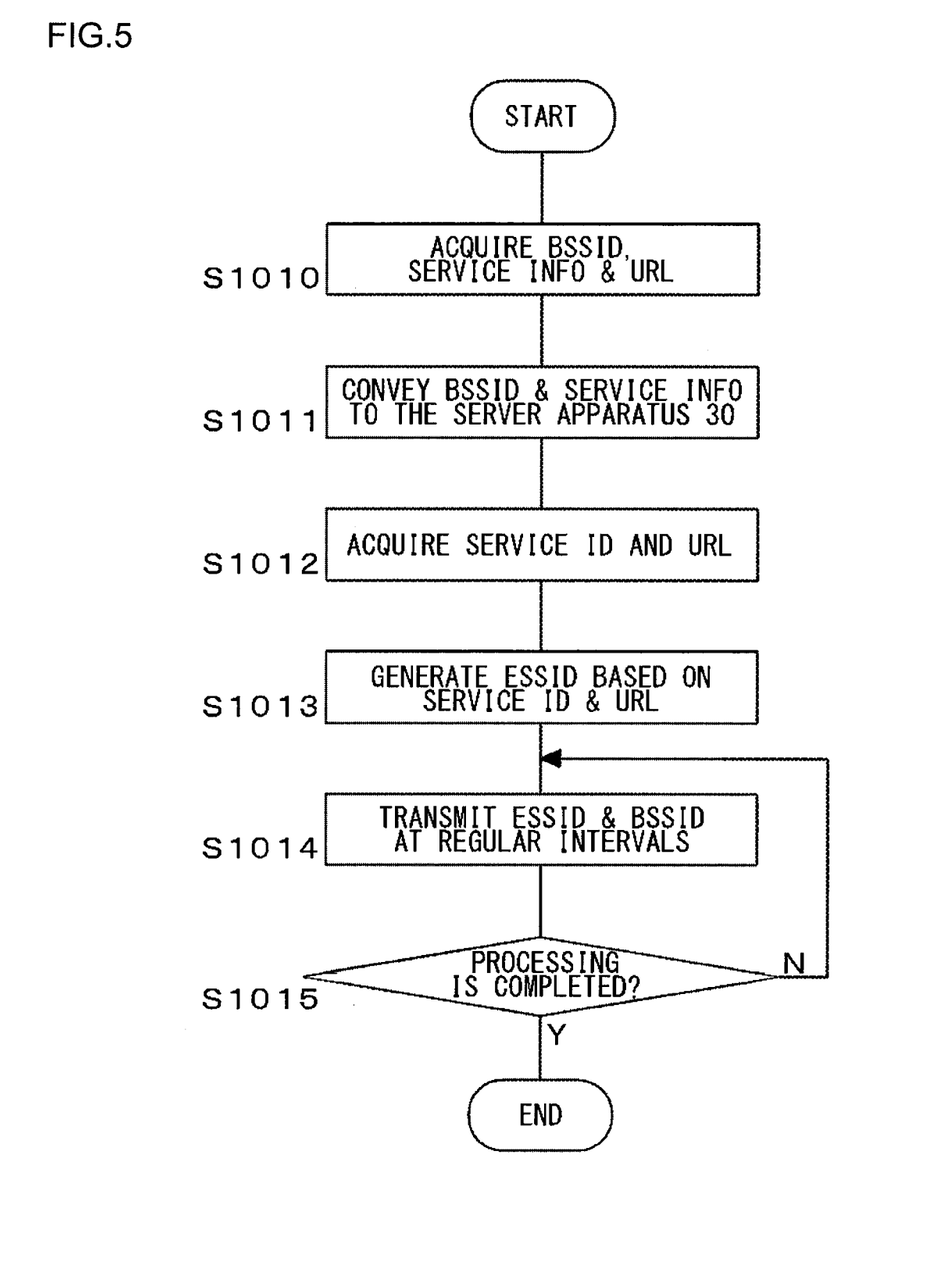
FIG. 5 is a flowchart showing an operation of a base station apparatus according to a second embodiment.

FIG. 5 is a flowchart showing an operation of the base station apparatus 1010 according to the second embodiment.

The service information transmitter 1012 acquires a BSSID, to which the same character string as that of the MAC address of the base station apparatus 1010 is set, the service information set by the manager, and the URL of the server apparatus 1030 from the device information storage 1011 (S1010). The service information transmitter 1012 accesses the server apparatus 1030, based on the URL acquired and conveys the BSSID and the service information thereto (S1011).

Then the identifier generator 1013 acquires the service ID and the aforementioned URL from the device information storage 1011 (S1012). The identifier generator 1013 generates an ESSID, based on the acquired service ID and URL (S1013).

Here, a description will be given of an example of the ESSID generation processing.

In this example, it is assumed that the URL is "http://www.sanyobroadcastservice.co.jp" and the service ID is "broadserv". The identifier generator 1013 generates a character string of 32 characters or less, which is usable as an ESSID, by combining the two character strings.

First, the character string of the URL is compressed in a ZIP format. This will generate binary data. Then the generated binary data is converted into a character string containing the alphameric characters by use of BASE64. This will generate a character string which is usable as an ESSID.

Referring back to FIG. 5, the beacon transmitter 1014 transmits the ESSID generated by the identifier generator 1013 and the BSSID acquired from the device information storage 1011 as a beacon at regular intervals (S1014). The transmission of the beacon is repeated until the end of the processing (Y of S1015).

Although the processing by the base station apparatus 1010 includes a connection processing to connect with the terminal apparatus 1020 and a content distribution processing by multicast, the description thereof is omitted here.

Figure 6:
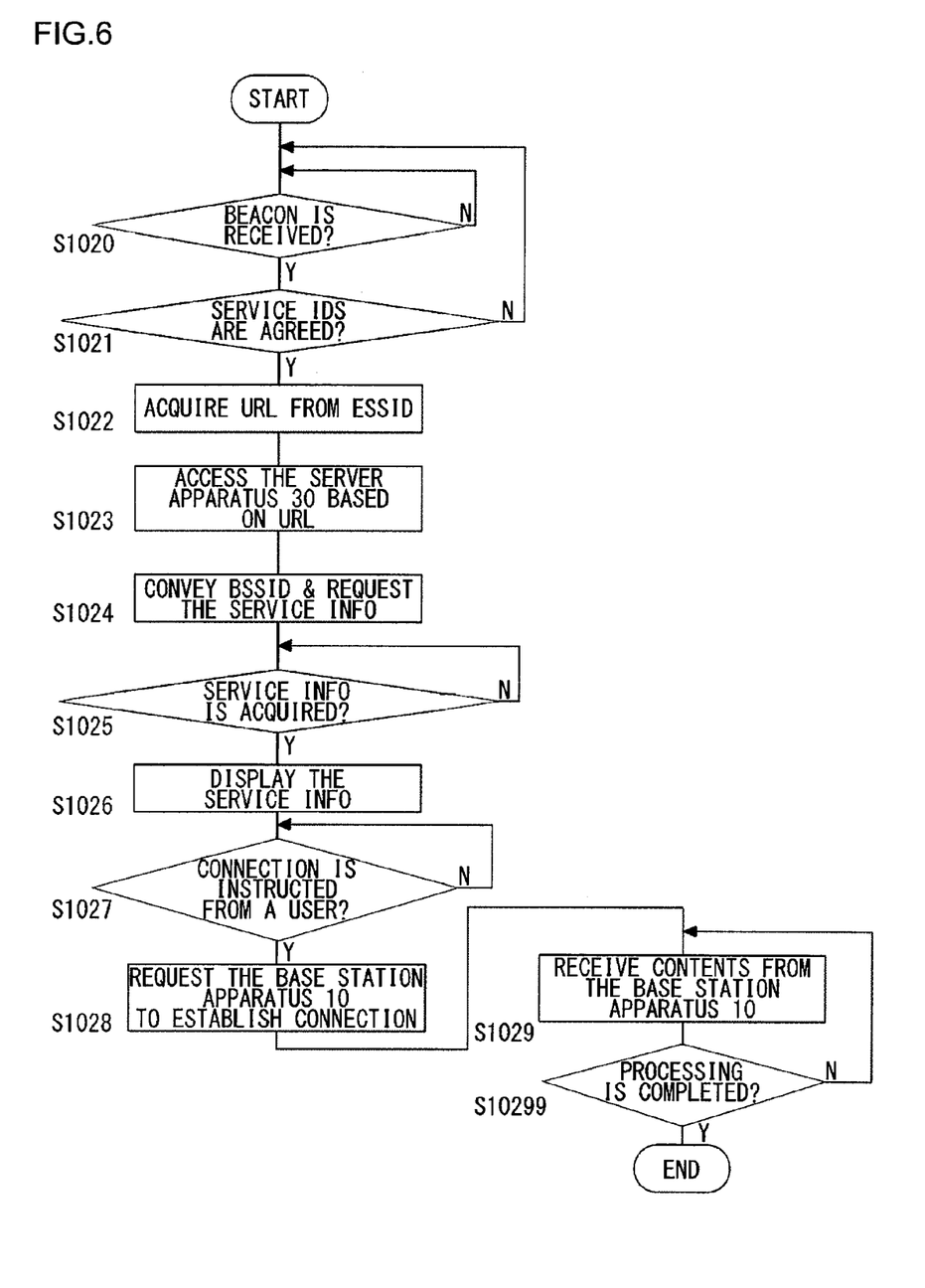
FIG. 6 is a flowchart showing an operation of a terminal apparatus according to a second embodiment.

FIG. 6 is a flowchart showing an operation of a terminal apparatus 1020 according to the second embodiment.

When connecting to the base station apparatus 1010, the beacon receiver 1021 receives a beacon sent out from the base station apparatus 1010 (S1020). The beacon contains an ESSID and a BSSID.

When the beacon receiver 1021 succeeds in receiving the beacon (Y of S1020), the identifier processing unit 1022 determines whether the service ID contained in the ESSID is in agreement with the service ID stored in the service ID storage 1023 or not (S1021). When the service ID is in agreement (Y of S1021), the identifier processing unit 1022 acquires a URL contained in the ESSID by performing a reverse conversion of the above-described ESSID generation processing (S1022).

The service information acquiring unit 1024 accesses the server apparatus 1030 based on the URL acquired by the identifier processing unit 1022 (S1023). With a connection to the server apparatus 1030 established, the service information acquiring unit 1024 requests service information by sending the BSSID contained in the beacon received by the base station apparatus 1010 (S1024).

When the service information acquiring apparatus 1024 succeeds in acquiring the service information from the server apparatus 1030 (Y of S1025), the service information acquiring unit 1024 sends the service information to the user interface 1025. The user interface 1025 displays the service information and waits for instructions from the user (S1026). Upon receipt of instructions for a connection from the user (Y of S1027), the connection processing unit 1026 makes a connection request to the base station apparatus 1010 (S1028). With the connection request permitted by the base station apparatus 1010, the not-shown content receiver of the terminal apparatus 1020 receives the content from the base station apparatus 1010 (S1029). The receiving of the content is continued so long as the processing does not come to an end (N of S10299).

Figure 7:
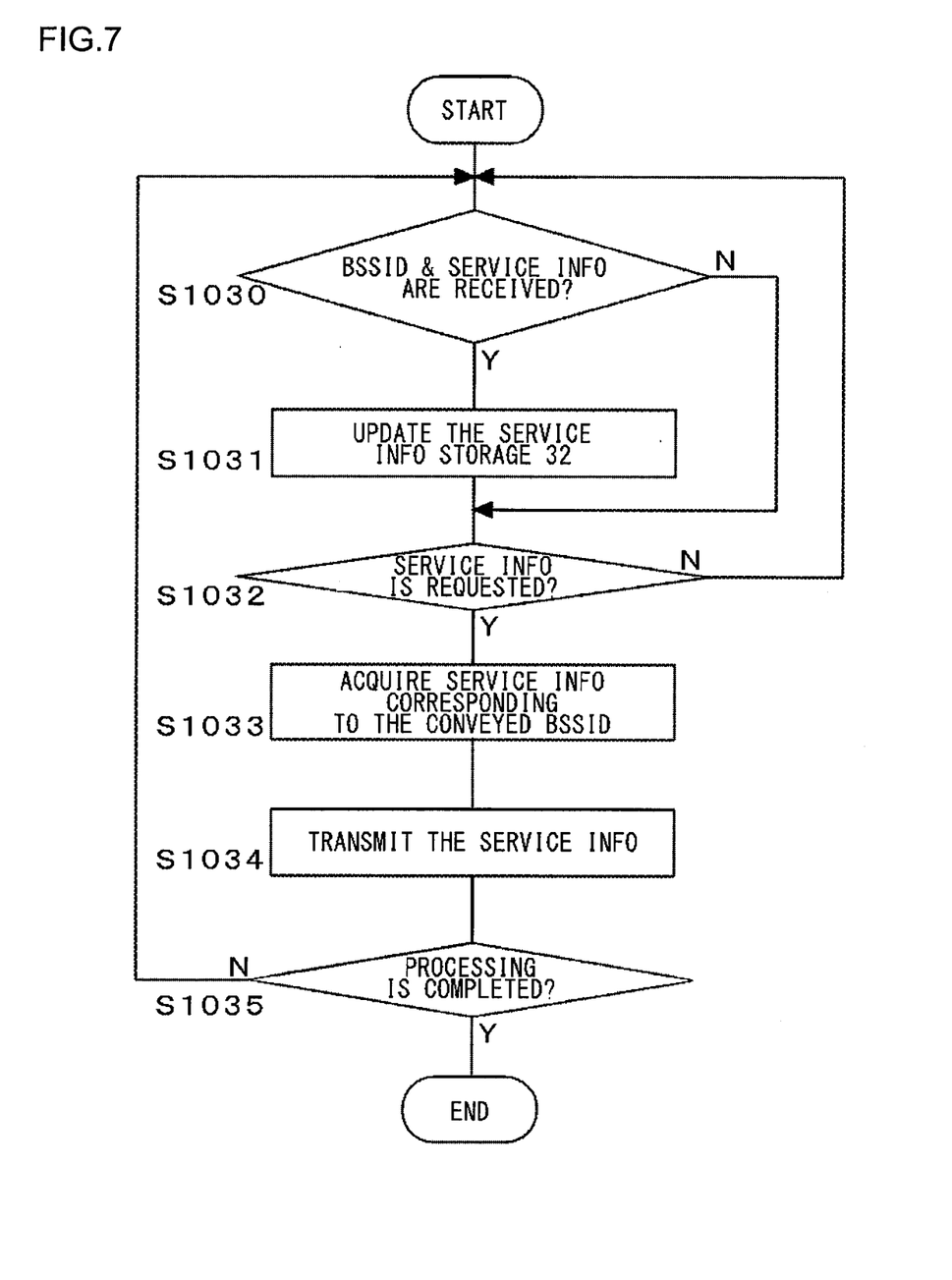
FIG. 7 is a flowchart showing an operation of a server apparatus according to a second embodiment.

FIG. 7 is a flowchart showing an operation of the server apparatus 1030 according to the second embodiment.

Upon receipt of a BSSID and service information from the base station apparatus 1010 (Y of S1030), the service information receiver 1031 stores them in association with each other in the service information storage 1032. That is, the content of the service information storage 1032 is updated (S1031).

Upon receipt of a request for service information from the terminal apparatus 1020 (Y of S1032), the service information providing unit 1033 acquires the service information corresponding to the BSSID contained in the request from the service information storage 1032 (S1033) and transmits the acquired service information to the terminal apparatus 1020 which is the origin of the request (S1034). The series of service information provision processings as described above will be continued so long as the processing of the whole system does not come to an end (N of S1035).

According to the present embodiment as described above, a sufficient amount of information can be offered to the user of the terminal apparatus using an identifier for which the number of settable characters is limited. Specifically, the information to be offered to the user is not directly included in the ESSID, but the URL is included instead, so that a sufficient amount of information can be offered to the user from the server apparatus of the URL. The ESSID is subject to a limitation on the number of characters, and the types of usable characters are also limited to the alphameric characters. In contrast to that, according to the present embodiment, service information can be freely written in a character string containing kanji, katakana, and hiragana characters among others, and information easy to read and understand can be supplied to the user.

Also, a URL, even when its character string is long, can be compressed and included in an ESSID. Also, through compression, it is possible to prevent terminal apparatus incompatible with the present independent broadcasting system from acquiring the URL. It is to be noted that when the information cannot be included in a single ESSID by compression, it may be divided and placed in a plurality of ESSIDs. Also, the service ID may be compressed in addition.

The present invention has been described based upon illustrative embodiments. The second embodiment is intended to be illustrative only and it will be obvious to those skilled in the art that various modifications to the combination of constituting elements and processes could be developed and that such modifications are also within the scope of the present invention.

Also, in the above-described ESSID generation processing, compression is done in ZIP format, but it may be done in other formats such as LZH format. Also, the binary data is encoded using BASE64, but other conversion means may be employed to do so. Also, when a URL can be included in a single ESSID without using compression, it is also possible to perform a processing without compression. In such a case, however, it is no longer possible to place restrictions on terminal apparatus incompatible with the present independent broadcasting system accessing the server apparatus.

INDUSTRIAL APPLICABILITY

The present invention offers a sufficient amount of information to the user of the terminal apparatus using an identifier for which the number of settable characters is limited.

What is claimed is:

1. A base station apparatus for distributing a predetermined content, comprising:
an identifier processor device configured to generate a notification service set identifier including a combination of service information for the predetermined content and a service ID, which is different from a connection service set identifier that is independent from a service ID identifying content distribution service, which is mapped to the service ID, and which is configured to permit a connection request from the terminal apparatus; and a beacon transmitter configured to transmit the notification service set identifier, generated by said identifier processor device, as a beacon; and a connection processing unit configured to reject a connection request by the notification service set identifier and to permit a connection request by the connection service set identifier, wherein said identifier processor device encrypts the connection service set identifier, and wherein said beacon transmitter transmits the connection service set identifier encrypted by said identifier processor device, as a beacon.

2. A base station apparatus according to claim 1, wherein said connection processing unit permits a connection request by a connection service set identifier stored beforehand in the terminal apparatus.

3. A base station apparatus according to claim 1, wherein said connection processing unit permits a connection request by the connection service set identifier decrypted by the terminal apparatus.

4. A terminal apparatus for receiving a predetermined content from a base station apparatus, comprising:
   a first identifier storage device configured to store first identifiers that are independent from a service ID identifying content distribution service and which are mapped to the service ID by which the base station apparatus permits a connection request;
   a beacon receiver configured to receive, as a beacon, a second identifier which contains information on the content and which is generated apart from the first identifier, from the base station apparatus;
   an identifier processing unit configured to extract the information on the content from the second identifier included in the beacon received by said beacon receiver;
   a user interface configured to provide the information extracted by said identifier processing unit and prompt a connection requesting instruction which is to be sent to the base station apparatus; and
   a connection processing unit configured to acquire a first identifier associated with the second identifier from said first identifier storage, upon receipt of the connection requesting instruction, and request the base station apparatus to establish a connection with said terminal apparatus using the acquired first identifier,
   wherein said beacon receiver receives a notification service set identifier including a combination of service information on content that should be distributed and a service ID by which to identify the base station apparatus, from the base station apparatus and wherein said terminal apparatus conveys the notification service set identifier received by said beacon receiver, to a server apparatus identified by the address information acquired by said identifier processing unit so as to acquire information on the content.

5. A terminal apparatus capable of receiving a predetermined content from a base station apparatus, the terminal apparatus comprising:
   an encryption key storage device configured to store an encryption key used to decrypt an encrypted first identifier which is mapped to a service ID by which the base station apparatus permits a connection request;
   a beacon receiver configured to receive, as a beacon, a second identifier which contains information from a combination of service information for the predetermined content and a service ID and which is generated apart from the first identifier and the encrypted first identifier from the base station apparatus;
   an identifier processing unit configured to extract the information on the content from the second identifier included in the beacon received by said beacon receiver;
   a user interface configured to provide the information extracted by said identifier processing unit and prompt a connection requesting instruction which is to be sent to the base station apparatus; and
   a connection processing unit configured to acquire the encryption key used to decrypt the encrypted first identifier from said encryption key storage, upon receipt of the connection requesting instruction from said user interface, decrypt the encrypted first identifier using the acquired encryption key and request the base station apparatus to establish a connection with said terminal apparatus using the acquired encryption key,
   wherein said beacon receiver receives a notification service set identifier including a combination of service information on content that should be distributed and a service ID by which to identify the base station apparatus, from the base station apparatus and wherein said terminal apparatus conveys the notification service set identifier received by said beacon receiver, to a server apparatus identified by the address information acquired by said identifier processing unit so as to acquire information on the content.

6. A communication system, including a base station apparatus, a terminal apparatus and a server apparatus, for distributing a predetermined content from the base station apparatus,
   said base station apparatus including:
      an identifier generator configured to generate, as an identifier by which to permit a connection request sent from the terminal apparatus, an extended service set identifier containing address information necessary for accessing said server apparatus, said extended service set identifier including a combination of service information for the predetermined content and a service ID, which is different from a connection service set identifier that is independent from a service ID identifying content distribution service, which is mapped to the service ID, and which is configured to permit a connection request from the terminal apparatus; and
      a beacon transmitter configured to transmit the extended service set identifier generated by the identifier generator and a second basic service set identifier by which to identify the base station apparatus in which a media access control address of the base station apparatus provided independent of the server apparatus is set, as beacons; and
      a connection processing unit configured to reject a connection request by the notification service set identifier and to permit a connection request by the connection service set identifier, wherein said identifier generator encrypts the connection service set identifier, and wherein said beacon transmitter transmits the connection service set identifier encrypted by said identifier generator, as a beacon,
   said terminal apparatus including:
      a beacon receiver configured to receive the beacons transmitted from said base station apparatus; an identifier processing unit configured to acquire address information contained in the extended service set identifier received by the beacon receiver; and an information acquiring unit configured to convey the second basic service set identifier, received by the beacon receiver, to a server apparatus, identified by the address information acquired by the identifier processing unit, via a network different from a network to be connected to the base station apparatus and configured to acquire information on the content from the identified server, said server apparatus including:

a storage configured to store the second basic service set identifier and the information on the content by associating them with each other; and an information providing unit configured to provide information on the content corresponding to the second basic service set identifier conveyed from the terminal apparatus, to the terminal apparatus by referencing the storage.

7. A communication system according to claim 6, wherein the address information is a uniform resource locator (URL), wherein the identifier generator compresses the URL and includes the compressed URL in the extended service set identifier.

8. A terminal apparatus, comprising:

a beacon receiver configured to receive a beacon transmitted from a base station apparatus which distributes a predetermined content;

an identifier processor device configured to acquire address information by which to access a server apparatus that stores information on the content, from a connection service set identifier that is independent from a service ID identifying content distribution service, which is mapped to the service ID, and which is configured to permit a connection request from the terminal apparatus and which is received by said beacon receiver;

an information acquiring processor device configured to acquire the information on the content from the server apparatus identified by the address information acquired by said identifier processor device; and a user interface configured to provide the information acquired by said information acquiring processor device and prompt a connection requesting instruction which is to be sent to the base station apparatus, wherein said beacon receiver receives a notification service set identifier including a combination of service information on content that should be distributed and a service ID by which to identify the base station apparatus, from the base station apparatus and wherein said information acquiring processor device conveys the notification service set identifier received by said beacon receiver, to a server apparatus identified by the address information acquired by said identifier processor device so as to acquire information on the content.

* * * * *

UNITED STATES PATENT AND TRADEMARK OFFICE
CERTIFICATE OF CORRECTION

PATENT NO.       : 8,477,944 B2                                              Page 1 of 1
APPLICATION NO.  : 12/680702
DATED            : July 2, 2013
INVENTOR(S)      : Tanaka et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 500 days.

Signed and Sealed this

Eighth Day of September, 2015

Michelle K. Lee
*Director of the United States Patent and Trademark Office*